UNITED STATES PATENT OFFICE.

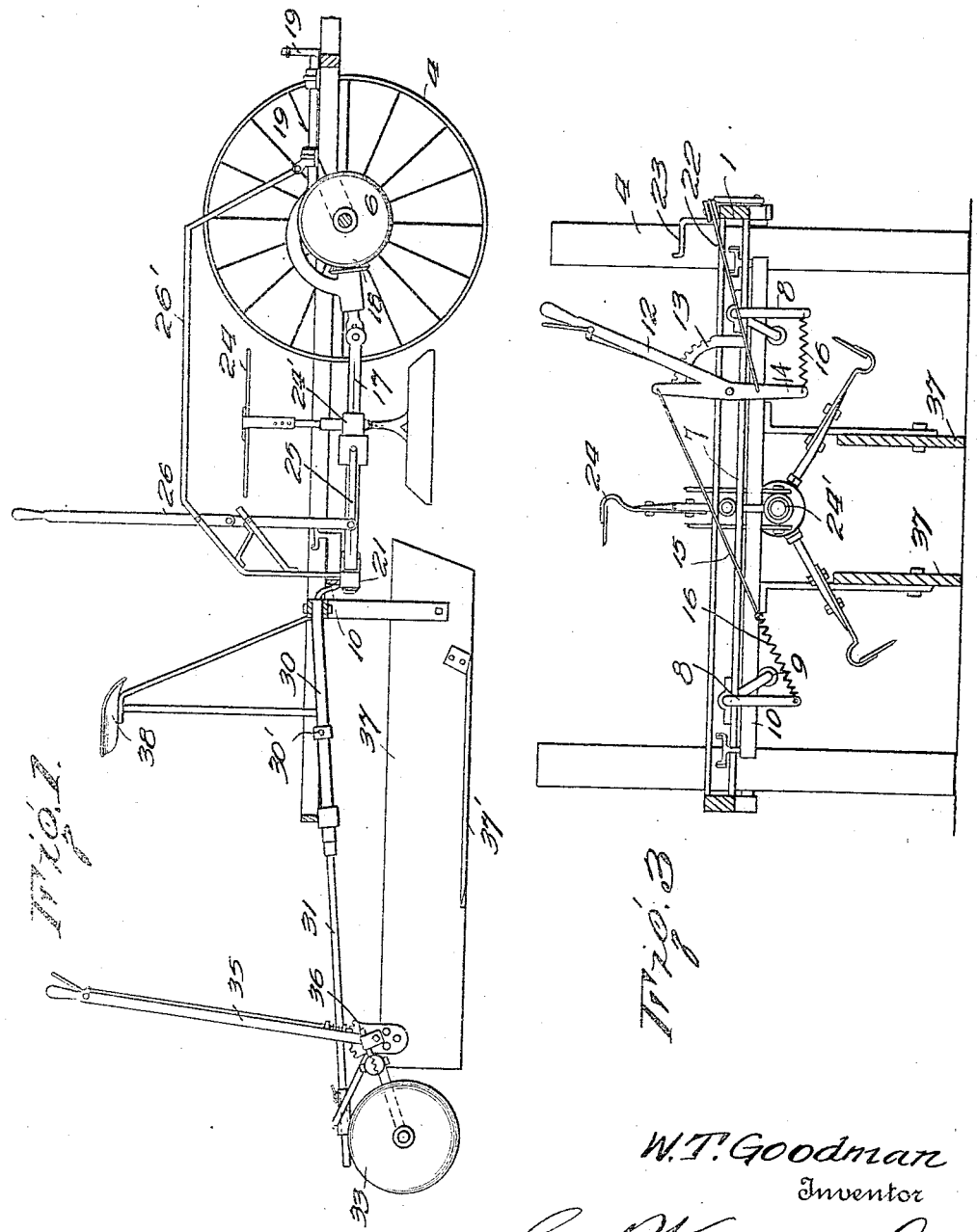

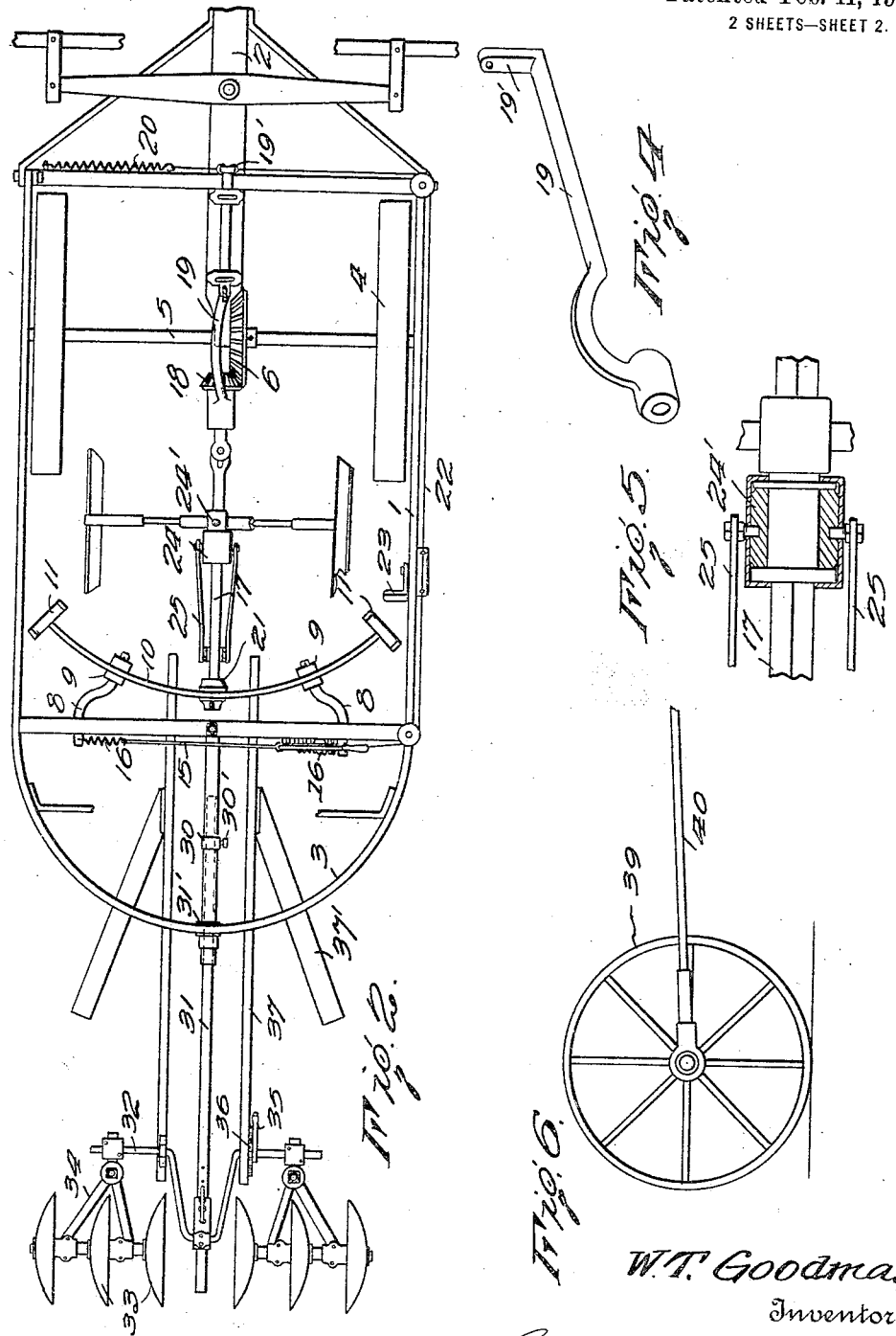

WILLIAM T. GOODMAN, OF QUANAH, TEXAS.

COTTON-CHOPPER.

1,294,259. Specification of Letters Patent. Patented Feb. 11, 1919.

Application filed January 24, 1918. Serial No. 213,529.

*To all whom it may concern:*

Be it known that I, WILLIAM T. GOODMAN, a citizen of the United States, residing at Quanah, in the county of Hardman and State of Texas, have invented certain new and useful Improvements in Cotton-Choppers, of which the following is a specification.

This invention relates to improvements in agricultural devices and the invention has more especial reference to a cotton chopper.

The invention has for its dominant object to provide an agriculture device whereby cotton can be chopped, the plants freed of weeds and the soil thereabout cultivated in but a single operation, thus effecting a material saving for the user.

It is also an object of the invention to provide a novel mounting for the cotton chopper, whereby the same may be shifted to different positions upon the frame of the device to permit the proper functioning thereof.

Another object of the invention is to provide means for elevating the cotton chopper so that it can be adjusted with relation to plants.

Other and further improvements and novel details in the construction and arrangement of parts will be appreciated from the description to follow, which, for a clear understanding of the invention should be considered in connection with the accompanying drawings forming a part thereof, and wherein the preferred embodiment of the invention is shown for the purpose of illustration.

In the drawings:—

Figure 1 is a side elevation of the improved agriculture device;

Fig. 2 is a top plan thereof;

Fig. 3 is a vertical transverse section taken through the same;

Fig. 4 is a fragmentary detail in perspective showing the means for supporting the cotton chopper;

Fig. 5 is a detail partly in section of the connection between the cotton chopper shaft and the cotton chopper; and Fig. 6 is a detail in side elevation of the wheel attachment for the device.

Similar characters of reference refer to similar parts throughout the several views of the drawings.

Having more particular reference to the drawings, 1 represents the frame of the device, the forward end of which is tapered and provided with a draft pole 2, while the rear end of the same is curved as at 3, for a purpose which will be hereinafter described. Wheels 4 are mounted upon an axle 5 journaled in bearings arranged in the forward portion of the said frame, a bevel gear 6 being mounted upon the intermediate portion of said axle whereby rotary motion may be transmitted therefrom.

A supporting bar 7 is arranged transversely of the rear extremity of the frame 1 and rotatably supports a pair of crank shafts 8, certain of the extremities of which are bent upon themselves and carry rollers 9 adapted to be arranged below and to movably support a curved head 10, which head carries stirrups 11 adjacent its opposite ends whereby the feet of an operator can be engaged with the same. Mounted upon the supporting bar 7 is a lever 12 provided with the usual quadrant 13, the teeth of which are adapted to be engaged by a slidable spring pressed pawl carried on the said lever. An arm 14 is formed on the lower portion of the lever 12, adjacent its pivotal mounting and has its opposite ends apertured whereby to permit connection with contractile coiled springs 16, the remaining ends of which are connected to the free ends of the crank shafts 8; the connection between one end of the arm 14 and one spring 16 being effected by a cable 15. By this means, it will be readily understood that upon rocking the lever 12, similar motion will be imparted to the crank shafts 8 and due to the fact that the curved head 10 rests upon the rollers 9 carried thereby, the same may be adjusted vertically to the desired extent. The head may be maintained in its adjusted position by engaging the pawl of the lever 12 with the quadrant 13. Due to the provision of the coiled spring 16, it will be understood that any shock which might be otherwise transmitted to the crank shafts 8 will be absorbed thereby.

Disposed longitudinally of the frame 1 is a universally jointed squared shaft 17 carrying a bevel gear 18 upon one end thereof, which gear is adapted to mesh with the gear 6 and is properly supported with relation thereto through the medium of a pivotal bearing arm 19 having an offset portion 19' which is engaged by a contractile coiled spring 20 having connection with the adjacent portion of the frame 1, thereby serving as means for normally maintaining the gear 18 in mesh with the gear 6. The remaining end of the shaft is pivotally connected as at 21 with the curved head 10. To control rotation of the shaft 17, the bearing arm, which is rotatably or pivotally secured to the draft pole 2 is engaged with a cable 22 extending rearwardly of the frame 1 into engagement with a foot lever 23 mounted upon the said frame 1 at a point convenient to the operator and with the lever 12 mounted on the bar 7 of the frame. Obviously, by rocking the foot lever 23 or the lever 12 in one direction a pull will be imparted to the cable 22 and as a consequence, the pivotal bearing arm 19 will be swung outwardly to cause disengagement of the gear 18 from the gear 6, thus interrupting the transmission of rotary motion to the shaft 17.

Slidably mounted upon the squared shaft 17 is a cotton chopper indicated in its entirety by the numeral 24, and comprising adjustably mounted blades the said chopper being provided with a squared bearing collar 24'. Arms 25 are engaged with the opposite sides of the bearing collar 24 and extend longitudinally of the shaft 17 into pivotal connection with the lower end of a hand lever 26, which lever as will be noted, is pivotally mounted upon the pivotal frame 26' at a point convenient to the operator.

When the device is used without the rearwardly arranged weeding attachment described and claimed in my pending United States application for Letters Patent bearing Serial Number 231,145 comprising the cutter blades 37', I provide a wheel attachment for the device; said attachment including a wheel 39 mounted in bearings formed in the bifurcated end of the rod 40, which rod, as will be noted, is of a size and shape to permit its introduction into the hollow rod 30, arranged on said weeding attachment. Thus, when the rod 40 is engaged with the rod 30 and the set-screw 35 is turned into engagement therewith, the device may be freely moved over a field or other surface being cultivated and also the cotton choppers 24 will be allowed to properly function.

A seat 38 is supported upon suitable standards on the bar 7 and, obviously, serves as means for receiving the operator of the device.

In operation, the device upon being drawn over a field or other surface will impart rotary motion to the shaft 17, it of course being understood that the bevel gear 18 is engaged with the gear 6. The cotton chopper may be moved to any desired position upon the shaft 17 by manipulating the lever connected thereto. Thus, the plants may be engaged at any desired point by the operator. To shift the shaft 17 horizontally in order that the cotton chopper may be accurately and properly engaged with the plants, the operator's feet are engaged in the stirrups 11, and moved in the desired direction. Since the shaft is pivotally connected to the head 10, the same will be permitted to move with the cotton chopper. The disk cultivators 33 upon being lowered into engagement with the soil will serve as means for effectually cultivating the same, while the runners 37 carrying their respective blades 37' will clear the soil of weeds and other undesirable growths. When turning the device, it will be understood that due to the pivotal engagement of the rod 30 with the frame 1, the roller arranged thereon will be caused to travel over the curved rear end 3 of the frame, said end serving as a form of fifth wheel and permitting the cultivator disks to be drawn after the same without doing injury to the plants. Due to the manner in which the cotton chopper is controlled by the operator, it is to be noted that the rotation and position of the same may be instantly shifted as the occasion may require with but little effort or exertion upon part of the operator.

By reason of the connection of the hand lever 12 and the foot lever 23 with the cable 22, it will be understood that the bevel gear 18 mounted on the bearing arm 19 may be engaged and disengaged from the gear 6 by either the foot or hand of the operator. Hence, quick operation of the device is permitted.

Manifestly, the construction shown is capable of considerable modification and such modification as is within the scope of my claim, I consider within the spirit of my invention.

I claim:

1. In a cotton chopper, a wheeled frame, a universally jointed driven shaft extending longitudinally of the frame and having connection with the wheels thereof, a curved head pivoted to the free end of said shaft, cranks supported on the frame having rollers thereon for movably receiving said curved head, means for collectively rotating said cranks to effect vertical adjustment of the head, means on the opposite ends of the head for facilitating longitudinal movement thereof, and chipping means carried on the shaft.

2. In a cotton chopper, a wheeled frame, a universally jointed shaft extending longitudinally of the frame and being disengageably connected with the wheels thereof, a curved head pivoted to the free end of said shaft, cranks supported on the frame having rollers on their free ends for movably supporting said head, means for collectively rotating the cranks to effect vertical adjustment of the head, stirrups on the free ends of the head for facilitating horizontal movement thereof, chopping means slidable on said shaft but adapted to rotate therewith, and means connected to the chopping means for adjusting the same along the shaft.

In testimony whereof, I affix my signature hereto.

WILLIAM T. GOODMAN.

Copies of this patent may be obtained for five cents each, by addressing the "Commissioner of Patents, Washington, D. C."